UNITED STATES PATENT OFFICE 2,501,197

CATALYTIC TREATMENT OF HYDROCARBON OILS

Preston L. Veltman and Arthur R. Goldsby, Beacon, N. Y., assignors, by mesne assignments, to The Texas Company, New York, N. Y., a corporation of Delaware No Drawing. Application December 30, 1939, Serial No. 311,942

12 Claims. (Cl. 196—52)

This invention relates to the catalytic treatment of hydrocarbons and particularly to the catalytic treatment of petroleum hydrocarbons.

Broadly, the invention contemplates treatment of hydrocarbons to effect molecular transformation thereof by contact with solid substantially non-volatile fluoride compounds, and particularly the solid metallic fluorides disposed in active form. The invention has particular application to the treatment of hydrocarbons to effect conversion of high molecular weight hydrocarbons into low molecular weight hydrocarbons for the production of hydrocarbons suitable for the manufacture of internal combustion motor fuel. In addition, it has application to the reforming of hydrocarbons, such as the reforming of naphtha hydrocarbons to improve their value as constituents of motor fuel.

In the catalytic cracking of oils to produce gasoline it has been the common practice to employ as catalysts such materials as fullers' earth, kieselguhr, activated clays, artificial zeolites, and synthetic compositions composed essentially of alumina and silica. It has also been proposed to incorporate in such catalysts various metallic oxides, such as the oxides of chromium, molybdenum, etc.

Ordinarily the oil to be cracked is heated and vaporized and the hot vapors are brought into contact with the solid catalyst under controlled conditions of temperature and pressure. The reaction products, including gas, gasoline hydrocarbons and higher boiling hydrocarbons, are separated in conventional ways. During the conversion coke-like material is deposited on the catalyst, reducing its activity and ability to catalyze the hydrocarbon conversion, and it becomes necessary to reactivate the catalyst. This is accomplished by burning off the coke with a stream of air or oxygen-containing gas. After thus reactivating the catalyst, it may be reused in cracking additional quantities of oil.

We have found that solid fluorides provide effective cracking catalysts and have discovered that catalysts containing solid fluoride compounds may be prepared and employed in a form which gives results superior to those obtainable with the solid catalysts previously employed in the art.

In accordance with this invention the catalyst comprises a stable, substantially solid fluoride, or mixture of fluorides, substantially non-volatile and active at temperatures up to about 1100° F. and under the pressures prevailing in the catalytic cracking of petroleum hydrocarbons for the production of gasoline. The catalyst advantageously comprises a solid metallic salt of hydrofluoric acid.

A preferred form of catalyst, which has been found particularly effective, comprises a solid hydrated metallic fluoride, such as the fluorides of aluminum, chromium and magnesium, for example, associated with a solid adsorbent material, either natural or artificial. Such adsorbent materials include silicious materials, such as fuller's earth, clay, silica, silicates, aluminum silicates, zeolites, etc., as well as non-silicious materials, such as charcoal, alumina, magnesia, etc.

Other adsorbent materials may be used as supporting or carrier media upon which the fluoride may be adsorbed or dispersed. While adsorbent materials have been mentioned specifically, it is, nevertheless, contemplated that this secondary material may comprise other finely-divided or pulverulent solid materials.

The invention thus contemplates a composite or mixed catalyst consisting of a solid stable metallic fluoride in combination with a secondary material or support. Stated in another way, it may be defined as a composite catalyst consisting of solid adsorbent material having fluorine associated with the adsorbent material in a stable substantially non-volatile form. The catalyst is thought to be particularly effective when in a porous non-fused form.

The following are examples of specific catalysts which have been found effective:

1. Magnesium fluoride-silica-aluminum fluoride catalyst in which the magnesium fluoride amounts to about 2% and the aluminum fluoride, in the form of the hemi-hydrate, amounts to about 6% by weight. This material was prepared by precipitating the magnesium fluoride in the presence of silica gel, finely-divided aluminum fluoride hydrate being added to the mixture prior to precipitation of the magnesium fluoride.

2. Chromium fluoride-silica catalyst containing about 10% by weight of chromous fluoride, prepared by precipitating chromium fluoride in the presence of wet hydrated silica gel, the gelatinous mass being dried and heated at 500° F. to form chromous fluoride.

3. Magnesium fluoride-Aqua Lox (98% aluminum silicate) catalyst containing around 10% by weight of magnesium fluoride, prepared by forming a slurry of Aqua Lox in water and treating the mixture with magnesium chloride and ammonium fluoride solutions.

4. Magnesium fluoride-alumina-silica catalyst, containing about 10% by weight of magnesium fluoride, made by first preparing a precipitate of silica gel, treating the precipitated silica gel with aluminum chloride, and then treating the resulting mixture with magnesium chloride and ammonium fluoride solutions.

5. Aluminum fluoride-magnesia catalyst, containing about 20% $AlF_3$ hemi-hydrate, prepared by forming a slurry of commercial magnesia and treating the slurry with solutions of aluminum chloride and ammonium fluoride.

6. Super Filtrol aluminum fluoride hemihydrate comprising a physical mixture containing about 10% by weight of the fluoride ground to around 40 to 50 mesh.

In each case the catalyst was dried, pelleted and calcined by heating at a temperature of around 1000° F. for from 6 to 8 hours. The resulting calcined pellets were then tested as cracking catalysts in the cracking of a virgin gas oil to produce gasoline. The tests demonstrated that these particular catalysts were effective in producing a high yield of gasoline with low yields of gas and carbon.

Catalyst 1, for example, was compared with a standard catalyst, which will be subsequently referred to as Catalyst "A," and which is a silica-alumina type of catalyst containing a high ratio of silica to alumina. According to this comparison, at a cracking temperature of about 1000° F., the fluoride catalyst gave a substantially higher yield of gasoline than the standard catalyst. In addition, the yields of gas and carbon were substantially lower than were those obtained with the standard catalyst.

The preparation of two catalysts, namely Catalyst "B," consisting of a compound containing about 80% $SiO_2$, 15% $MgF_2$, and 5% $AlF_3 \cdot \frac{1}{2}H_2O$, and Catalyst "C" comprising the above-mentioned standard Catalyst "A" containing about 10% aluminum fluoride hemi-hydrate will now be described more specifically.

*Catalyst "B"*

A batch of sodium-free hydrated silica was prepared by neutralizing a dilute solution of sodium silicate with dilute hydrochloric acid, filtering and washing free of sodium in the wet state. 4,830 grams of this silica gel, containing approximately 400 grams of $SiO_2$, were slurried with 10 liters of water until a uniform dispersion resulted. A finely ground mixture containing 90 grams of ammonium fluoride and 30 grams of $AlF_3 \cdot \frac{1}{2}H_2O$, was added to the slurry while stirring, the stirring being continued for about 20 minutes.

This slurry was then treated with about 2 liters of an aqueous solution of magnesium chloride containing about 7% by weight of $MgCl_2$, and stirring continued for about one hour.

The pH was then adjusted to about seven with dilute hydrochloric and ammonium hydrate solutions. The resulting precipitate was removed by filtration and washed once by slurrying with water and filtering. The washed precipitate was dried to about 20% water content at 250° F. and pelleted. The pellets were calcined at about 1000° F. for six hours.

*Catalyst "C"*

A batch of the previously mentioned standard Catalyst "A," in the form of pills, was moistened with aluminum chloride solution. The moistened pills were heated at about 200° F. for about three hours so as to remove approximately one-half of the water added with the aluminum chloride solution. Thereafter the pills were cooled to room temperature. The cooled pills were then moistened with an aqueous solution of ammonium fluoride. These pills were then maintained at a temperature of around 212° F. until dry. Following this they were calcined by heating at 1000° F. for four hours.

The aluminum chloride and ammonium fluoride solutions used were of sufficient concentration to produce a final product containing 10% by weight of aluminum fluoride.

Experiments were conducted for the purpose of comparing the effectiveness of Catalysts "B" and "C" with the standard Catalyst "A" in the cracking of virgin gas oil having an end boiling point of 700° F. and derived as a distillate from East Texas crude. The vaporized gas oil, heated to about 1000° F., was charged continuously to a tower, packed with the catalyst in pill form, at a space velocity of 2.2 (400 cubic centimeters of gas oil per hour per 180 cubic centimeters of catalyst). The tower was maintained at a temperature of 1000° F. and under atmospheric pressure.

The total liquid product obtained during successive intervals of time was separately accumulated and analyzed to determine the content of debutanized gasoline having an end boiling point of 400° F.

*Comparison of yields (volume percent basis charge) obtained with catalysts "A" and "B"*

| Sample Period-Hours | Catalyst "A" | Catalyst "B" |
|---|---|---|
| 0.0 to 0.5 | 20.2 | 22.4 |
| 0.5 to 1.0 | 19.3 | 19.6 |
| 1.0 to 1.5 | 20.5 | 22.2 |
| 1.5 to 2.0 | 19.0 | 20.2 |
| 2.0 to 2.5 | 16.8 | 21.4 |
| 2.5 to 3.0 | 14.4 | 17.6 |
| 3.0 to 3.5 | 16.3 | 20.3 |
| 3.5 to 4.0 | 15.7 | 19.7 |
| Average Yield | 17.8 | 20.5 |
| Average Octane No. (L-3 Method) | 84 | 83 |

*Gas and carbon yields per cent basis charge average for first two hours on stream*

|  | Catalyst "A" | Catalyst "B" |
|---|---|---|
| Gas | 18.5 | 10.9 |
| Carbon | 3.19 | 0.9 |

As the foregoing data reveal, Catalyst "B," comprising the metallic fluoride compound did not lose its activity nearly so rapidly as did standard Catalyst "A." Moreover, the average yields obtained with the metallic fluoride catalyst were substantially greater than those obtained with the standard catalyst.

In addition, the fluoride catalyst produced substantially less gas than the standard catalyst, i. e., around 10.9% by weight as compared with 18.5% by weight on the basis of the gas oil charged. Likewise, the carbon yield is very much lower, being 0.9% as compared with 3.19% by weight for the standard catalyst.

The reduction in carbon yield is of particular advantage since it permits easier and quicker regeneration of the catalyst with less opportunity for deterioration of the catalyst during regeneration.

The following tabulation affords a brief comparison of the effectiveness of Catalysts "A" and "C" when used in the catalytic cracking of the same type of gas oil charge under similar conditions of temperature and space velocity:

*Volume per cent of 400° F. end point debutanized gasoline (basis charge)*

| Sample Period-Minutes | Catalyst "A" | Catalyst "C" |
|---|---|---|
| 0 to 30 | 22 | 28.8 |
| 30 to 60 | 21.8 | 29.1 |
| 60 to 120 | 18.2 | 29.5 |
| Weight percent of charge to gas | 21.7 | 13.2 |

This tabulation illustrates the substantial improvement in gasoline yield realized when the standard catalyst is used in combination with a solid metallic fluoride. The gasoline yield is much greater and the yield of gas is much less. Also, it will be observed that over the two hour period the metallic fluoride catalyst apparently did not decrease in activity, whereas the standard catalyst did lose activity.

While a cracking temperature of 1000° F. is mentioned in the foregoing examples, it is contemplated that the temperatures may vary considerably from this range, for example, from about 700° to 1100° F. Also, the space velocity may vary from that mentioned above and may range from around 1 to 10. The pressure used may vary as desired and may be around atmospheric to 100 pounds, for example.

It is also contemplated that other solid fluoride compounds than those specifically mentioned may be employed in forming the catalyst, but particularly those compounds having metallic properties, including the solid metallic and metalloid fluorides, and which are stable and substantially non-volatile at temperatures up to about 1200° F.

It is an important object of the invention to use a solid type of catalyst containing the fluoride in an active form and in a form which is stable and substantially non-volatile under the conditions of temperature above specified. It may be employed in pellet, pill or powdered form.

Besides aluminum, chromium and magnesium, which have already been mentioned, the fluorides of other metallic elements may be used, for example, barium, calcium, cerium, copper, iron, manganese, nickel, potassium, strontium, uranium, etc., as well as metalloid elements, such as bismuth.

The catalysts described above show an unexpected advantage in ease of reactivation. The carbonaceous deposit on the catalyst is easily removed by an oxygen containing gas without substantial temperature rise in a relatively short time as compared with previously known catalysts. While this is in part due to the smaller deposition of carbon with these catalysts, it is also thought that the carbon is deposited in a somewhat different form, such that it is more readily burned from the catalyst.

While vapor phase cracking has been described above, it is contemplated that the catalysts of this invention may be employed in liquid phase cracking. The characteristic of low carbon deposition with these catalysts, even at low temperatures, i. e., 700 to 750° F., and therefore in the presence of liquid hydrocarbons, indicates their suitability for cracking under substantial pressures.

It is contemplated that the powdered form of the catalyst is particularly applicable to a cracking system wherein the catalyst is passed continuously through the reaction zone.

Obviously many modifications and variations of the invention, as hereinbefore set forth, may be made without departing from the spirit and scope thereof, and therefore only such limitations should be imposed as are indicated in the appended claims.

In the appended claims, by reference to "metallic" fluoride it is intended to include both metal and metalloid fluorides.

We claim:

1. A solid catalyst adapted for the conversion of hydrocarbons at elevated temperatures, comprising a metallic fluoride compound which is substantially nonvolatile at temperatures below about 1200° F. and which contains magnesium fluoride, aluminum fluoride and silica.

2. In thermal conversion reactions selected from the group consisting of catalytic cracking and reforming hydrocarbon oil to produce high octane gasoline hydrocarbons, the method which comprises heating hydrocarbon vapors to an elevated temperature in the range 700° F. and above, subjecting the heated vapors at a pressure of around atmospheric to 100 pounds per square inch to brief intimate contact with a synthetic, substantially sodium-free solid catalyst comprising an active metallic fluoride which is substantially non-volatile at temperatures below about 1200° F. in association with an adsorbent material, to effect substantial conversion into gasoline hydrocarbons of high octane value with relatively low carbon formation.

3. The method according to claim 2 in which the hydrocarbon vapors are maintained in contact with the catalyst at a temperature of around 700 to 1100° F.

4. In thermal conversion reactions selected from the group consisting of catalytic cracking and reforming hydrocarbon oil to produce high octane gasoline hydrocarbons, the method which comprises heating hydrocarbon oil to a temperature in the range around 700° F. and above, subjecting the heated oil at a pressure of around atmospheric to 100 pounds per square inch to intimate contact with a synthetic, substantially sodium-free solid catalyst comprising a metallic fluoride which is substantially non-volatile at temperatures below about 1200° F. in association with an adsorbent silicious material, and maintaining the heated oil in contact with the catalyst momentarily such as to effect substantial conversion into gasoline hydrocarbons of high octane value with relatively low carbon formation.

5. In thermal conversion reactions selected from the group consisting of catalytic cracking and reforming hydrocarbon oil to produce high octane gasoline hydrocarbons, the method which comprises heating hydrocarbon vapors to an elevated temperature in the range 700° F. and above, subjecting the heated vapors at a pressure of around atmospheric to 100 pounds per square inch to brief intimate contact with a synthetic, substantially sodium-free solid catalyst comprising an aluminum fluoride in association with an adsorbent silicious material, to effect substantial conversion into gasoline hydrocarbons of high octane value with relatively low carbon formation.

6. In thermal conversion reactions selected from the group consisting of catalytic cracking and reforming hydrocarbon oil to produce high octane gasoline hydrocarbons, the method which comprises heating hydrocarbon vapors to an elevated temperature in the range 700° F. and above, subjecting the heated vapors to brief intimate contact with a solid synthetic, substantially sodium-free catalyst comprising an aluminum fluoride in association with an adsorbent material to effect substantial conversion into gasoline hydrocarbons of high octane value with relatively low carbon formation.

7. In thermal conversion reactions selected from the group consisting of catalytic cracking and reforming hydrocarbon oil to produce high octane gasoline hydrocarbons, the method which comprises heating hydrocarbon vapors to an elevated temperature in the range 700° F. and above, subjecting the heated vapors to brief intimate contact with a solid synthetic, substantially sodium-free catalyst comprising magnesium fluoride in association with an adsorbent material to effect substantial conversion into gasoline hydrocarbons of high octane value with relatively low carbon formation.

8. The method of cracking hydrocarbon oil to produce high octane gasoline which comprises passing the oil in vapor form while at cracking temperature in contact with a solid synthetic catalyst comprising aluminum fluoride in association with an adsorbent siliceous material to effect substantial conversion into gasoline of high octane value.

9. A method of cracking hydrocarbon oils which comprises passing the oil in vapor form while at cracking temperature in contact with a catalyst containing at least 10% by weight of aluminium fluoride and maintaining said oil vapor in contact with said catalyst for a period sufficient to obtain the desired conversion.

10. The method of cracking hydrocarbon oil to produce high octane gasoline which comprises passing the oil in vapor form while at cracking temperature in contact with a solid synthetic catalyst comprising aluminum fluoride, magnesium fluoride and silica.

11. A method of cracking hydrocarbon oils which comprises causing the oil in vaporized form while at cracking temperatures to contact a catalyst consisting essentially of a synthetic gel and at least 10% by weight of a fluoride of aluminum, and maintaining said oil in contact with said catalyst for a period of time sufficient to obtain the desired conversion.

12. A method of cracking hydrocarbon oils which comprises passing the oil in completely vaporized form while at cracking temperature in contact with a catalyst initially comprising silica hydrogel and at least 10% by weight of a fluoride of aluminum, and maintaining said oil vapor in contact with said catalyst for a period sufficient to obtain the desired conversion.

PRESTON L. VELTMAN.
ARTHUR R. GOLDSBY.

REFERENCES CITED

The following references are of record in the file of this patent:

UNITED STATES PATENTS

| Number | Name | Date |
|---|---|---|
| 372,672 | Hall | Nov. 8, 1887 |
| 1,963,245 | Pier | June 19, 1934 |
| 2,154,527 | Pier et al. | Apr. 18, 1939 |
| 2,195,747 | Kuencke et al. | Apr. 2, 1920 |

FOREIGN PATENTS

| Number | Country | Date |
|---|---|---|
| 607,155 | France | June 28, 1926 |